UNITED STATES PATENT OFFICE.

JOSEPH FLEISCHMANN, OF NEW YORK, N. Y., ASSIGNOR TO HIMSELF AND ALOES FLEISCHMANN, OF OLMUTZ, AUSTRIA.

IMPROVED PROCESS OF PREPARING GRAIN FOR DISTILLATION.

Specification forming part of Letters Patent No. 45,793, dated January 3, 1865.

*To all whom it may concern:*

Be it known that I, JOSEPH FLEISCHMANN, of the city, county, and State of New York, have invented or discovered a new and Improved Process or Method of Treating Indian Corn, Wheat, Rye, Barley, and other Cereals, as an improvement on Aloes Fleischmann's patent, July 12, 1864, for the more perfect distillation of alcohol and spirits; and I do hereby declare the following to be a full description of the same.

In the use of Aloes Fleischmann's invention I have discovered that in the preparation of the sulphurous-acid gas by the mixture of sulphuric acid with charcoal in a retort there is an excess of acid carried over and into the water prepared for soaking the corn, unless great care is used in regulating the heat applied to the retort to eliminate the sulphurous-acid gas, which thereby produces an injurious effect upon the coppers of the still, and at the same time tending to retard the fermenting process too much; and also I discovered the further fact that a weaker acid is more desirable to obtain the best results in the fermentation of the corn than that of sulphurous acid.

The object of my invention, therefore, is to improve the use of the said Aloes Fleischmann's process for manufacturing alcohol and spirits from Indian corn and other cereals; and the nature of my invention consists in the new method or process I have discovered of preparing the corn or other cereals for the purpose of softening the vitreous and gummy matters of the grain, so as to increase or stimulate, as it may be said, the development of the saccharine matter of the cereals, and, as a matter of course, increasing the production of alcohol or spirits as the result of the distillation.

To describe my invention of a new process for manufacturing alcohol and spirits, I will set forth the following description as my process for a given weight of grain.

Into a suitable tub for such purpose provided for soaking the grain I first put about twelve gallons of water. Next I charge the water with sulphurous-acid gas, which I obtain from six and one-half ounces of sulphuric acid and two ounces of charcoal mixed together in a retort, and eliminated by the heat of a furnace upon which the retort is adjusted.

It will be obvious that sulphurous-acid gas may be prepared in other ways and by other means and answer an equally good purpose. My invention, however, is not for any particular mode of generating sulphurous-acid gas or hyposulphurous-acid gas, but is for its use as a part of my process, and therefore to that extent I limit my claim to it.

When the water is thus charged with the sulphurous-acid gas I mix with it thirteen ounces of bicarbonate of soda (or the proportion of two ounces of the soda for each ounce of the sulphuric acid used to prepare the sulphurous-acid gas) for the purpose of neutralizing any excess of acid it may contain, and at the same time obtaining a sulphur-acid of a lower degree of oxygenation than sulphurous-acid-gas water, and thus avoid all tendency to corrode the coppers of the still, and to impregnate the liquor with the dissolved copper, as well as the tendency to delay or prevent the fermentation of the grain to develop the alcohol by too much acidity of the solvent or water in which the grain is soaked.

It will be obvious that other sodas or alkalies may be used as the equivalent for the bicarbonate of soda I have used, and therefore I do not limit myself to the use of bicarbonate, but shall use its chemical equivalent whenever convenience may require me to do so to effect the object set forth by me.

Although I have mentioned definite proportions of the water, sulphuric acid, charcoal, and soda used by me in the preparation of the sulphur-acid-water solvent, and believe them to be the best formula that can be used, yet I have no doubt but slight variations of those proportions may be made and still good results attained. I therefore do not desire to be limited to those precise quantities of the water, sulphuric acid, charcoal, and soda hereinbefore mentioned, but wish it understood that I claim the use of those substances when used in the proportions substantially as set forth.

Having now prepared the sulphur-acid-gas water, (or "hyposulphurous-acid-gas water" perhaps it may be said to be,) I put into it about one hundred pounds of either of the cereals intended to be used, (previously crushed in any suitable mill for such purposes,) and allow it to remain in the water to soak for about fifteen hours, except when Indian corn is the grain used, which I allow to remain in soak for thirty hours, as its gummy and vitreous particles are less soluble than the other cereals. After the soaking process the grain is then removed to the "mash-tub" to undergo a like treatment as is commonly adopted by distillers in the manufacture of alcohol and spirits, except when Indian corn is used, which does not require more than 178° of heat, or thereabout, of Fahrenheit grade, in the mashing operations.

Having now described my improved process for making alcohol and spirits, I will proceed to set forth what I claim and desire to secure by Letters Patent of the United States:

The use of the method or process hereinbefore described for treating or preparing Indian corn and the other cereals in the manufacture of alcohol and spirits, as an improvement upon Aloes Fleischmann's patent of July 12, 1864, for a like purpose.

JOSEPH FLEISCHMANN.

Witnesses:
LEOPOLD BLEIER,
CHARLES L. BARRITT.